United States Patent Office 2,732,285
Patented Jan. 24, 1956

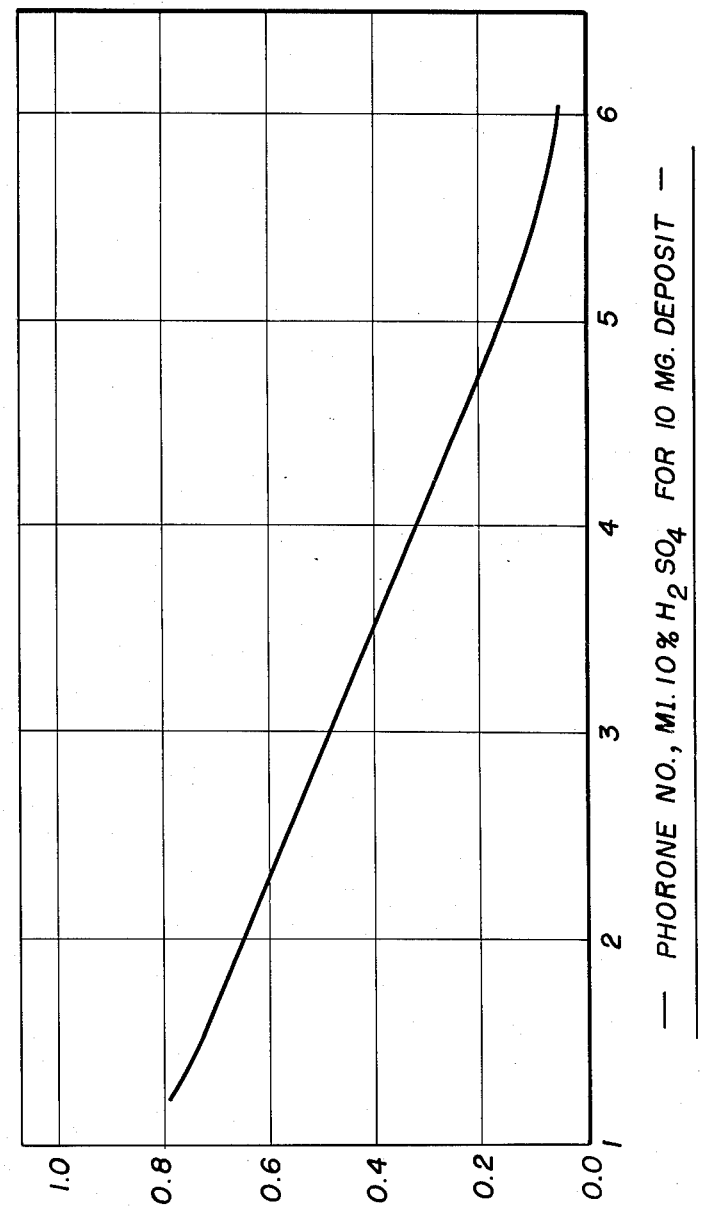
CATERPILLAR ENGINE TEST, RING ZONE DEMERIT @ 120 HRS.
CHARLES S. LYNCH
ELMER B. CYPHERS   Inventors
By _____ Attorney

2,732,285
METHOD FOR DETERMINING THE DEPOSIT-FORMING TENDENCIES OF OILS

Charles S. Lynch, Plainfield, and Elmer B. Cyphers, Cranford, N. J., assignors to Esso Research and Engineering Company, a corporation of Delaware Application December 23, 1952, Serial No. 327,516

9 Claims. (Cl. 23—230)

The present invention relates to a method for determining the deposit forming tendencies of oils such as mineral lubricants and the like used in internal combustion engines. It is particularly concerned with a rapid and inexpensive laboratory screening test for measuring the relative effectiveness of various detergent additives for such oils.

The rapidly increasing demand for additives useful in improving the properties of lubricants, fuels and the like has accelerated research and development work on new and improved materials meeting special needs. Of particular interest has been the development of detergent-type additives having the ability of keeping deposit-forming materials suspended in the oil thereby preventing coke, varnish and other deposits from forming on critical engine parts. Laboratory and full-scale engine tests have been the most reliable tests for determining additive effectiveness. In such tests, the test oil is used in an engine operated under standard conditions. The engine is then dismantled, and the parts are inspected for deposits. These tests are costly and time consuming. The evaluation of a single detergent additive will cost from several hundred to several thousand dollars and will generally require from two to twenty days. Furthermore, these tests require a relatively large amount of oil and additive.

It is obvious, then, that engine tests are impractical as a means for screening out the better members of the literally hundreds of new compounds that are prepared during the course of an experimental investigation. Attempts have been made to develop rapid, small-scale laboratory tests to supplement engine evaluations. For example, in one test the oil is dripped as a thin film on a hot metal plate and then any deposits that are formed are weighed. In another test, a metal plate is suspended in the oil, the heated oil is blown with air, and the deposits are weighed. These and other tests fail to give consistent, reliable information, and in many cases are misleading in comparison with actual engine performance. It is therefore a principal object of the present invention to provide a simple, inexpensive and rapid laboratory test method for accurately predicting the performance of motor oils and the like with reference to their high-temperature detergency characteristics and their ability to prevent harmful engine deposits.

In accordance with this invention, a lubricating oil and an oil-soluble condensable organic compound are mixed. The mixture is heated, preferably with a condensation agent, in the presence of a deposit accumulator under reaction conditions whereby a synthetic sludge comprising oil-insoluble, high molecular weight condensation products are formed. The synthetic sludge is of such type that at least a portion of it tenaciously adheres to the surface of the accumulator. The amount of the tenaciously adhering surface deposits is determined to obtain a measure of the engine deposit forming tendencies of the oil. An oil of unknown engine deposit forming tendencies, for example, the base stock used in the above test plus an experimental additive may be likewise tested under the same conditions to obtain a direct comparison between the oils. It is thus possible to obtain information on the deposit forming tendency of an oil that correlates with actual engine performance.

The test of this invention is quite inexpensive in comparison with engine tests, requires only a small amount of oil, and requires no more than several hours to complete. Therefore, it is a valuable tool in screening new oil additives, not only because the test is rapid but also because only a small amount of additive must be prepared for the initial test. It is also useful in studying the effect of process variables on the quality of additives and lubricants, for monitoring of additives and lubricant production quality, for selecting the optimum combination of additives for use in a new oil base stock, and for testing the relative degradation of oils after extended periods of use in engines.

Although it is not desired to be bound by theoretical considerations, it is believed that the reliability of the test of the present invention arises for the following reasons. Modern theories are inclined to the view that the blow-by of fuel combustion products into the crankcase of internal combustion engines operating at high temperatures, accompanied by oxidation and polymerization, is a major factor contributing to engine deposits. The types of combustion products contributing most to lubricant degradation and deposit formation are probably the easily polymerized products of partial combustion and $SO_3$ coming from sulfur present in the fuel, or other acidic materials. By conducting a simple laboratory test under simulated engine temperature conditions, in which a polymerizable organic compound capable of forming an insoluble tenaciously adhering sludge is added to the test oil, it is possible to obtain results that semi-quantitatively predict engine performance.

The lubricating oils used in the test may be any suitable oil that is useful in internal combustion engines. Such oils include the ordinary mineral lubricants, "heavy duty" types of lubricants, and various synthetic lubricants such as those prepared by polymerization of olefins, by reaction of oxides of carbon with hydrogen, and by other means. Synthetic oils of the ester, polyester, polyether types and the like may be used alone or in combination with mineral lubricants. The base oil may be used per se or may have blended in it various conventional additives such as detergents, antioxidants, pour depressors, viscosity index improvers, oiliness agents and the like.

For the purpose of standardizing the test conditions, one or more test oils should be available which show moderately good performance in the particular type of engine test with which a correlation is desired. The standard test oil may be different for different types of engine tests, since an oil which gives a very clean Chevrolet L-4 engine, for example, may be entirely inadequate for a Caterpillar Series II test, etc. Thus the oil chosen for standardization should not give a completely clean nor an excessively dirty engine, since it would then be difficult to distinguish performance either better or worse than the standard.

The organic compound used to form synthetic sludge in the test oil should be capable of condensing to high molecular weight bodies that are at least partially insoluble in the test oil at the test temperature. For the purpose of this specification and the following claims, the term "condensing" and related terms will refer to polymerization and condensation reactions and the like. It is further important that at least a measurable portion of this synthetic sludge be capable of tenaciously adhering to the deposit accumulator. It has been found that any soft, oily sludge, that can be easily removed from the accumulator by washing, mild rubbing and the like, has no important bearing on the amount of permanent hard deposits formed in automotive and diesel engines.

Such organic compounds will be selected with regard to the type of lubricant base stock to be tested. Thus, for essentially hydrocarbon base stocks, organic compounds containing oxygen, sulfur, nitrogen or mixtures of these and the like in substituent groups are useful for forming synthetic sludges that are incompatible with the base stock. The organic compound is preferably an unsaturated olefinic-type compound or capable of reacting to form such an unsaturated compound. Particularly suitable are compounds containing conjugated systems of double bonds.

Compounds especially suitable for use in mineral oils are the mildly oxidized hydrocarbons, particularly those containing at least one carbonyl group such as in the case of aldehydes, ketones, and the like. These compounds preferably contain at least one unsaturated carbon to carbon linkage such as in the case of dioleyl ketone, benzalacetone, benzalacetophenone, mesityl oxide, isophorone, crotonaldehyde and the like. Most preferable are compounds which contain two olefinic double bonds in an alpha, beta position with respect to a carbonyl group. These include styryl ketone, dicinnamylidine acetone and particularly phorone. Such compounds may be formed by condensing lower molecular weight ketones containing at least one alpha hydrogen atom, such as acetone, in the presence of an acid catalyst by procedures known in the art.

The molecular weight of the sludge-forming compound is not particularly critical, but the higher compounds having a relatively low volatility are more useful for tests carried out at atmospheric pressure. Thus, mesityl oxide is less preferred than phorone. In general, these compounds will have in the range of about 5 to 30 carbon atoms although higher molecular weight compounds may be used. The organic compound is preferably substantially completely soluble in the lubricant base stock at the test temperature in order to obtain intimacy of contact.

It is generally necessary to carry the test out in the presence of a condensation agent, such agents including suitable polymerization catalysts, condensation agents and the like. Acidic materials are generally most useful, especially acids having a pH below about 3. Inorganic acids such as sulfuric acids, $SO_3$, hydrochloric acid and the like are preferred because they apparently simulate the type of acidic constituents formed in combustion zones of engines. Other acids include chloracetic acid, picric acid, oxalic acid and the like. Water may be present; the strength of the acid will be varied depending on the type of organic material being treated. Friedel-Crafts catalysts such as $AlCl_3$, and $BF_3$, as well as organic and inorganic peroxides may be employed.

In establishing standard test conditions, the amount of organic compound added to the test oil should be sufficient to form a measurable amount of the clinging type of deposit as heretofore mentioned. It should not be used in sufficient proportions to affect the overall solubility of the deposits in the test oil. As a general rule, in the range of about 0.5 to 25%, preferably 5 to 15%, by weight of the organic compound, based on the lubricant, will be sufficient. The specific amount will vary to a large extent on the type of lubricant to be tested and on the performance level required to be met in engine service, as well as on the condensation characteristics of the organic compound, and is not particularly critical as long as the above requirements are met.

The amount of condensation agent or catalyst used will depend almost entirely on the relative ease with which the condensable material reacts, the activity of the catalyst used, and the types of detergent additives in the base oil. For acid catalysts, the amount may range as much as from 1 to 100%, based on the condensable organic compound, although lower or higher concentrations may be used if necessary.

The test may be carried out in any suitable type of container, preferably one that is equipped with a stirrer or other means for maintaining the contents in an agitated state during reaction. The container may be constructed of glass, ceramic material, stainless steel or other suitable material. It may be equipped to operate under pressure, but this is not essential if a nonvolatile condensable organic compound is used. The reaction is usually carried out in the presence of air, and if desired, air or other oxygen-containing gas may be bubbled through the reacting mixture. The container may also serve as the deposit accumulator, the deposit forming on the walls and bottom of the vessel being weighed after the test is completed. The deposit accumulator may be a strip of glass, metal, or other solid material suspended in the solution during the test. The surfaces of the accumulator should be thoroughly clean. The container may be jacketed for heating purposes or may simply rest on a hot plate or other heating devices in order to maintain the required elevated temperature conditions.

The test is carried out by placing the desired lubricant to be tested in the clean, weighed container, carefully weighing the amount of oil, and heating the oil up to the reaction temperature. This temperature should simulate temperatures attained by the lubricant under internal combustion engine operating conditions, and may range from about 200° to 450° F., preferably 250° to 350° F. The oil is stirred until the desired temperature level is reached, and the condensable organic compound and condensing agent are added. The contents are then stirred for the time required to form the synthetic sludge. This time may vary from as little as 5 minutes up to several hours. The contents of the container are then removed, and the surface of the deposit accumulator is rinsed with an aliphatic naphtha or other washing agent that will not effect the tenaciously adhering deposits. It is usually necessary to wipe the surfaces of the accumulator with a clean cloth to remove any deposits loosened by the naphtha such that only the firmly adhering materials remain. After rinsing and drying, the accumulator is weighed, and the amount of tenaciously adhering deposits is determined.

Several methods may be used for comparing the relative performance of detergene additives, once the standard test conditions have been determined. One method is based on the fact that under otherwise constant conditions, increasing the detergent concentration in the oil decreases deposit formation. In this method, a level of deposit formation in the laboratory test that corresponds to a satisfactorily low deposit level in full scale engines is first ascertained. Several laboratory tests are then carried out on oil blends containing various concentrations of the detergent to be evaluated in order to obtain deposit values bracketing the desired low level. These data may then be interpolated to arrive at an estimate of the amount of detergent required in the oil to give satisfactory engine performance.

Another method is based on the fact that the amount of hard deposits increases as the amount of condensing agent is increased, other conditions being constant. Therefore, several tests may be conducted by varying the amount of condensing agent in order to determine that amount required to give a satisfactory low level of deposit formation. Relatively high amounts of condensing agent are indicative of an oil having good detergent characteristics; low amounts show the reverse situation. It will be obvious to the skilled workman that other variations of the test technique may be used without departing from the spirit and scope of the present invention.

The following examples are presented for the purpose of demonstrating specific embodiments of the invention.

Example 1.—Evaluation of test conditions

Experiments were carried out to evaluate phorone and phorone bottoms as condensable organic compounds for the detergency test. The phorone bottoms were prepared by saturating acetone with HCl gas, storing it for two weeks, removing the HCl catalyst by washing and neutralizing, and stripping the mixture to a 300° F. vapor temperature to remove mesityl oxide, and recovering the bottoms containing phorone and higher molecular weight condensation products of acetone.

The experiments were carried out in a 300 cc. tall-form open glass beaker provided with a stirrer. 100 grams of test oil were weighed into the clean, weighed beaker, and the beaker was then placed in an oil bath maintained at 275° F. After stirring the test oil for 10 minutes, 10 cc. of phorone and the required amount of 10% $H_2SO_4$ were added, followed by a reaction period with additional stirring for a time sufficient to form the synthetic sludge. The oil was then poured off, and the beaker was then rinsed with heptane, wiped with a clean cloth to remove loose deposits, dried and weighed.

Tests were carried out on oils whose deposit forming characteristics in the CRC-L-1-545 Caterpillar engine test were known. The ring zone demerit, which is the most critical factor in this test, was used as a basis for comparison. Under the laboratory test conditions used above, in the range of about 1 to 10 cc. of 10% $H_2SO_4$ and reaction times of about 40 to 60 minutes gave optimum correlations with L-1 engine performance.

The L-1 Caterpillar test is described on page 347 of the CRC Handbook, 1946 edition, published by Coordinating Research Council, Inc. This is a standard test used in evaluating motor oils under the Army Ordnance Specification MIL-L-2104 for heavy duty oils. Oils to meet the requirements of Supplement I of the same specification are evaluated in the same test except that fuel containing 1.0% sulfur is used to increase the severity of the test. In these tests, deposit formation is rated on a demerit scale ranging from zero to 10. A zero rating is given to perfectly clean engine parts whereas a 10 rating indicates the worst possible condition that could be obtained in operation of the engine. In some engine tests, a regular diesel fuel was employed to meet MIL-L-2104 requirements. In others, a fuel containing 1% sulfur was used to meet Supplement I requirements.

Example 2.—Evaluation of calcium sulfonate detergent additives

A number of oil soluble calcium petroleum and synthetic sulfonates prepared by various procedures were evaluated by the phorone and Caterpillar tests of Example 1. The base oil used in all tests was a conventional solvent extracted, Midcontinent HD 30 grade oil. The phorone tests were carried out with 10 cc. of commercial 42% phorone, 3 cc. of 10% $H_2SO_4$ and a reaction time of one hour at 275° F. for 100 g. of oil. Several runs were made on each sample of additive to determine the amount needed to reduce total beaker deposits to 10 mg. Caterpillar tests were run on the oils containing 3% by weight of each of the calcium sulfonates used in the phorone test. The engine was operated for 240 hours with a diesel fuel containing 1% sulfur. Comparative results are shown in Table I, below:

TABLE I

| Sample of Calcium Sulfonate Tested | Phorone Test, Wt. Percent of Calcium Sulfonate Needed in Oil to Give 10 mg. of Deposits | Caterpillar Engine Test, Ring Zone Demerit, Percent of Reference |
|---|---|---|
| Benzene Base, Synthetic | 3.6 | 80 |
| Do | 3.6 | 90 |
| Petroleum | 3.7 | [1] 100 |
| Do | 3.9 | 130 |
| Naphthene Base, Synthetic | 4.1 | 200 |
| Petroleum | 5.0 | 320 |

[1] Reference blend. Demerit ratings on other blends expressed as percent demerit based on the reference blend.

An excellent correlation was obtained between the test results and actual engine performance.

Example 3.—Evaluation of various lubricant detergent additives

A series of phorone and Caterpillar tests were carried out on various diesel mineral lubricant base stocks containing various amounts and types of commercial detergent additives. The phorone test was carried out using 5 cc. of phorone bottoms (described in Example 1) in 100 g. of the test oil, 275° F. and one hour reaction time. Several runs were carried out on each oil blend in which the amount of 10% $H_2SO_4$ was varied. The amount of acid required to give 10 mg. of hard beaker deposits was designated as the "Phorone Number." Each engine test was conducted for 120 hours using a conventional diesel fuel. Results are shown in Table II, below:

TABLE II

| Commercial Base Oil Used | Commercial Detergent Additive Blended in Oil | | Phorone No. | Caterpillar Ring Zone Demerit |
|---|---|---|---|---|
| | Detergent Type | Amt., Vol. Percent | | |
| Solvent Extracted Mid-Continent | Metal Phenate Plus Oxidation Inhibitor | 3.3 | 4.1 | 0.26 |
| Do | Neutralized $P_2S_5$ Treated Olefin Plus Oxidation Inhibitor | 3.7 | 4.5 | 0.11 |
| Do | Metal Sulfonate | 4.4 | 3.6 | 0.55 |
| Do | Metal Phenate | 4.4 | 1.4 | 0.86 |
| Do | Metal Phenate Plus Metal Sulfonate | 4.4 | 5.6 | 0.24 |
| Do | do | 4.4 | 5.6 | 0.02 |
| Solvent Extracted Coastal | Metal Phenate Plus Oxidation Inhibitor | 4.5 | 4.5 | 0.08 |
| Solvent Extracted Mid-Continent plus Solvent Extracted Coastal | Metal Phenate | 2.75 | 1.9 | 0.67 |

A plot of phorone number vs. ring zone demerit rating is shown in the sole figure. Good agreement was obtained in the tests.

Example 4.—Evaluation of pure phorone

Pure phorone was employed in the evaluation of various lubricant base stocks. When employing a reaction temperature of 275° F. and a reaction time of one hour, best results were obtained with 10 ml. of pure phorone and varying amounts of 20% $H_2SO_4$ to obtain the phorone number.

Example 5.—Evaluation of new and used lubricants

The phorone test was applied to a number of new and used railroad diesel lubricants containing various amounts of detergent additive. It was found that there was a linear relationship between the phorone number and the amount of detergent additive remaining in the oil. The phorone test is therefore useful in determining the extent to which detergent additives are lost from or degraded in a lubricant after extended service periods.

What is claimed is:

1. A method for testing lubricating oil which comprises adding to a lubricating oil a minor amount of oil-soluble condensable unsaturated organic compound and an acidic condensing agent, heating the resulting mixture at a temperature in the range of about 200° to 450° F. in the presence of a deposit accumulator to form oil-insoluble, high molecular weight condensation products, at least a portion of which adhere tenaciously to the surface of said accumulator, and weighing the amount of deposits which adhere tenaciously to said accumulator in contact with said oil, said unsaturated organic compound containing at least one carbonyl group in the molecule.

2. A method for testing the deposit-forming tendencies of mineral lubricating oil which comprises the steps of mixing said oil and a minor amount, less than about 25% by weight based on said oil, of an oil-soluble, condensable organic compound and an inorganic acidic condensing agent, agitating the mixture at a temperature in the range of about 250° to 350° F., in the presence of a deposit accumulator, forming oil-insoluble, high molecular weight condensation products, at least a portion of which tenaciously adhere to the surface of said accumulator, and weighing the amount of tenaciously adhering surface deposits on said accumulator, said condensable organic compound containing at least one carbonyl group and at least one unsaturated carbon-to-carbon linkage in the molecule.

3. A method as in claim 2 wherein said organic compound contains aliphatic double bonds in an alpha, beta position with respect to said carbonyl group.

4. A method as in claim 3 wherein said organic compound is a condensation product of a low molecular weight ketone.

5. A method as in claim 4 wherein said condensation product comprises phorone.

6. A method as in claim 5 wherein said inorganic condensation agent is sulfuric acid.

7. A method for testing the internal combustion engine deposit forming tendencies of mineral lubricants which comprises the steps of determining standard test conditions in which a mixture comprising a major amount of a mineral lubricant, and in the range of about 0.5 to 25% by weight, based on the lubricant, of an alpha, beta unsaturated ketone, and sulfuric acid are agitated together at a temperature in the range of about 200 to 450° F., in the presence of a deposit accumulator, forming a high molecular weight synthetic sludge, at least a portion of which tenaciously adheres to the surface of said accumulator, and determining the amount of said tenaciously adhering deposits on said accumulator, and then determining the comparative amount of said surface deposits formed when treating another lubricant under said standard test conditions.

8. A method as in claim 7 wherein said ketone is a condensation product of acetone.

9. A method as in claim 8 wherein said ketone comprises phorone.

References Cited in the file of this patent

UNITED STATES PATENTS 2,317,950     Burk et al. _____ Apr. 27, 1943

OTHER REFERENCES

"The Scientific Principles of Petroleum Technology," by Gurwitsch and Moore, pages 104–114.